United States Patent
Miyake

(10) Patent No.: US 8,832,796 B2
(45) Date of Patent: Sep. 9, 2014

(54) WIRELESS COMMUNICATION TERMINAL, METHOD FOR PROTECTING DATA IN WIRELESS COMMUNICATION TERMINAL, PROGRAM FOR HAVING WIRELESS COMMUNICATION TERMINAL PROTECT DATA, AND RECORDING MEDIUM STORING THE PROGRAM

(75) Inventor: Yasunari Miyake, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 749 days.

(21) Appl. No.: 12/273,178

(22) Filed: Nov. 18, 2008

(65) Prior Publication Data

US 2009/0158400 A1 Jun. 18, 2009

(30) Foreign Application Priority Data

Dec. 14, 2007 (JP) .................................. 2007-323372

(51) Int. Cl.
| | |
|---|---|
| H04L 29/06 | (2006.01) |
| H04L 9/00 | (2006.01) |
| H04W 12/08 | (2009.01) |
| G06F 21/62 | (2013.01) |
| H04W 48/16 | (2009.01) |
| H04W 84/12 | (2009.01) |
| H04W 48/00 | (2009.01) |
| H04W 8/26 | (2009.01) |
| H04W 88/02 | (2009.01) |

(52) U.S. Cl.
CPC ........... *H04W 12/08* (2013.01); *G06F 21/6218* (2013.01); *H04W 48/16* (2013.01); *H04L 63/10* (2013.01); *G06F 2221/2141* (2013.01); *H04W 84/12* (2013.01); *H04W 48/00* (2013.01); *H04W 8/26* (2013.01); *H04W 88/02* (2013.01)
USPC ................. 726/4; 370/345; 370/338; 455/566

(58) Field of Classification Search
USPC ........ 726/2, 4, 6; 370/338, 345–350; 455/566
See application file for complete search history.

(56) References Cited

U.S. PATENT DOCUMENTS 7,308,703 B2 * 12/2007 Wright et al. ..................... 726/1
2002/0125886 A1 * 9/2002 Bates et al. ................... 324/307

(Continued)

FOREIGN PATENT DOCUMENTS

| JP | 2003099400 A | 4/2003 |
|---|---|---|
| JP | 2004-266870 | 9/2004 |

(Continued)

OTHER PUBLICATIONS

Extended European search report dated Jul. 16, 2010 for corresponding European application #EP 08021218.6. (8 pages).

(Continued)

*Primary Examiner* — Peter Shaw
*Assistant Examiner* — Ali Shayanfar
(74) *Attorney, Agent, or Firm* — Osha Liang LLP

(57) ABSTRACT

Security of a file or an application program saved in a wireless communication terminal is maintained. A process performed by the wireless communication terminal includes the steps of: detecting an access point for wireless LAN (Local Area Network) based on a signal sent from a wireless communication I/F; obtaining an SSID (and a MAC address) of the detected access point; referring to access management data stored in a hard disk based on the obtained SSID; and restricting access to the file or the program based on the access management data.

10 Claims, 7 Drawing Sheets

(56) References Cited

U.S. PATENT DOCUMENTS

| | | | |
|---|---|---|---|
| 2003/0061166 A1* | 3/2003 | Saito et al. | 705/54 |
| 2004/0165211 A1* | 8/2004 | Herrmann et al. | 358/1.15 |
| 2004/0249983 A1* | 12/2004 | Bedner | 709/249 |
| 2005/0204127 A1* | 9/2005 | Dive-Reclus et al. | 713/152 |
| 2006/0112428 A1* | 5/2006 | Etelapera | 726/16 |
| 2006/0120526 A1* | 6/2006 | Boucher et al. | 380/247 |
| 2006/0293029 A1* | 12/2006 | Jha et al. | 455/411 |
| 2007/0280186 A1* | 12/2007 | Kaneko | 370/338 |
| 2007/0294747 A1* | 12/2007 | Rosenberger | 726/4 |

FOREIGN PATENT DOCUMENTS

| | | |
|---|---|---|
| JP | 2004-304344 | 10/2004 |
| JP | 2005-142848 | 6/2005 |
| JP | 2007-143117 | 6/2007 |
| JP | 2007323282 A | 12/2007 |
| WO | 03/081932 A1 | 10/2003 |

OTHER PUBLICATIONS

Patent Abstracts of Japan for Japanese Publication No. 2004-304344, Publication date Oct. 28, 2004 (1 page).
Patent Abstracts of Japan for Japanese Publication No. 2004-266870, Publication date Sep. 24, 2004 (1 page).
Patent Abstracts of Japan for Japanese Publication No. 2005-142848, Publication date Jun. 2, 2005 (1 page).
Patent Abstracts of Japan for Japanese Publication No. 2007-143117, Publication date Jun. 7, 2007 (1 page).
Office Action for Japanese Application No. 323372/2007 mailed Jan. 10, 2012, with English translation thereof (7 pages).
espacenet, Patent Abstract for Japanese Publication No. 2003099400 dated Apr. 4, 2003 (1 page).
espacenet, Patent Abstract for Japanese Publication No. 2007323282 Published Dec. 13, 2007 (1 page).

\* cited by examiner

WIRELESS COMMUNICATION TERMINAL, METHOD FOR PROTECTING DATA IN WIRELESS COMMUNICATION TERMINAL, PROGRAM FOR HAVING WIRELESS COMMUNICATION TERMINAL PROTECT DATA, AND RECORDING MEDIUM STORING THE PROGRAM

BACKGROUND OF THE INVENTION

1. Field of the Invention

The present invention relates to a technique for protecting data saved in a wireless communication terminal, and particularly to a technique for protecting data depending on a range in which wireless communication can be established.

2. Description of the Background Art

A notebook personal computer, a portable phone, a PDA (Personal Digital Assistant), or another wireless communication terminal has a storage device of a large capacity and it is capable of saving document data, spreadsheet data or another file, simulation software, an electronic payment system, or other application programs. In addition, with improvement in portability, a location where a wireless communication terminal can be used is not limited to an office or a home but includes a public area where wireless communication can be established such as a station.

In order to connect a wireless communication terminal to a network for use, a parameter for allowing communication with the network should be set.

For example, Japanese Patent Laying-Open No. 2007-143117 discloses an invention for simplifying setting of a communication parameter without making a user aware of the communication parameter. In setting a communication parameter, a communication device according to this invention identifies a communication parameter setting wireless network based on a network identifier of its own. When a network identifier matching with the network identifier of the communication device can be identified, a communication parameter is set for a communication device within the wireless network. If identification of a network identifier fails, switching to manual setting of a communication parameter is made (see the Abstract).

Japanese Patent Laying-Open No. 2005-142848 discloses an invention relating to a wireless LAN (Local Area Network) system with improved security, reducing load on an authentication server and a network and authenticating a client connected to wireless LAN. According to this invention, an access point 3 stores authentication information for authenticating a client 2 in a cache memory and refers to the authentication information, and authenticates client 2 that has requested access to wireless LAN 5 on behalf of an authentication server 1. Therefore, the wireless LAN system in which transmission of security information between access point 3 and authentication server 1 is reduced and security is improved as well as load on authentication server 1 and network 4 is mitigated can be obtained (see the Abstract).

In addition, Japanese Patent Laying-Open No. 2004-266870 discloses an invention relating to a parameter setting system, in which a set of parameters necessary for connecting a personal computer to a connection target network through wireless LAN can automatically be set. According to this invention, an access point provided in the connection target network sends a beacon 13 including an SSID (Service Set Identification) code representing one parameter in that one set of parameters. A personal computer 20 includes an SSID extractor 14 receiving beacon 13 through wireless LAN and extracting the SSID code, a network connection information file 17 having that one set of parameters, a registry 19, and a parameter detector outputting that one set of parameters in network connection information file 17 as a detected parameter and writing the detected parameter in registry 19 as the set parameter when the SSID code received from SSID extractor 14 matches with one parameter in that one set of parameters in network connection information file 17 (see the Abstract).

Moreover, regarding the use of the wireless communication terminal, a user may leave the wireless communication terminal behind or the wireless communication terminal may be stolen. Therefore, security of the wireless communication terminal also gives rise to a problem.

Japanese Patent Laying-Open No. 2004-304344 discloses an invention capable of preventing leakage of confidential data even if a computer terminal is stolen. According to this invention, a computer terminal device 50 requests connection with a wireless LAN access point 30, transmits a request to wireless LAN access point 30, identifies a security zone by determining whether connection with wireless LAN access point 30 has been established or not and whether a received MAC (Media Access Control) address of wireless LAN access point 30 matches with a MAC address registered in advance or not, registers data requiring data security service in the security zone as registration data, restricts access to the registration data, and discards the registration data when computer terminal device 50 is identified as being outside the security zone, and a server device 10 transmits the MAC address of wireless LAN access point 30 in response to a request (see the Abstract).

According to the conventional techniques as described above, various types of setting (such as proxy, validity/invalidity of DHCP (Dynamic Host Configuration Protocol), an IP (Internet Protocol) address, or the like) of the network can be changed in accordance with an access point (SSID) of wireless LAN. In addition, according to the technique disclosed in Japanese Patent Laying-Open No. 2004-304344, in order to maintain security of data saved in the wireless communication terminal, a server device providing security service is required. Therefore, a configuration for maintaining security becomes complicated and security cannot be improved in a simplified manner.

SUMMARY OF THE INVENTION

The present invention was made to solve the above-described problems, and an object of the present invention is to provide a wireless communication terminal capable of protecting data such as a file and an application program stored therein.

Another object of the present invention is to provide a method for protecting data such as a file and an application program stored in a wireless communication terminal.

Another object of the present invention is to provide a program for implementing a method for protecting data such as a file and an application program stored in a wireless communication terminal.

Yet another object of the present invention is to provide a recording medium storing a program for implementing a method for protecting data such as a file and an application program stored in a wireless communication terminal.

In summary, a wireless communication terminal according to one aspect of the present invention includes: a communication unit configured to communicate a signal by radio; a storage unit configured to store a file or a program, a plurality of pieces of identification data for identifying each of a plurality of base stations with which the wireless communication terminal can communicate, and access management data associated with each piece of the identification data for controlling access to the file or the program for each base station; a display unit configured to display an image; and a control unit configured to control an operation of the wireless communication terminal. The control unit is configured to detect a base station that can communicate with the wireless communication terminal based on the signal received by the communication unit and to control access to the file or the program based on the access management data associated with the identification data of the detected base station.

Preferably, the access management data includes at least any of data defining permission of display of a file name, data defining permission of reading of the file, data defining permission of writing in the file, and data defining permission of execution of the program.

Preferably, the control unit is configured to sense change of a base station detected as a base station with which communication can be established and to control access to the file or the program based on the access management data associated with the newly sensed base station when the access management data associated with the newly sensed base station is different from the access management data associated with the base station that had been detected prior to sensing of the change.

Preferably, data protection standard based on a plurality of pieces of the access management data is different for each piece of the access management data. The control unit is configured to control access to the file or the program based on the access management data higher in the protection standard when the protection standard of the access management data associated with each detected base station is different.

Preferably, the access management data is associated with data for identifying a node on a communication network in addition to the identification data.

A method for protecting data stored in a wireless communication terminal according to another aspect of the present invention includes the steps of: detecting a base station based on a signal received through a wireless communication interface; specifying access management data associated with the detected base station; and controlling access to a file or a program stored in the wireless communication terminal based on the access management data associated with the detected base station.

According to another aspect of the present invention, a program for protecting data stored in a wireless communication terminal is provided. The program causes the wireless communication terminal to execute the steps of: detecting a base station based on a signal received through a wireless communication interface; specifying access management data associated with the detected base station; and controlling access to a file or a program stored in the wireless communication terminal based on the access management data associated with the detected base station.

According to yet another aspect of the present invention, a computer-readable recording medium storing a program for protecting data stored in a wireless communication terminal is provided. The program causes the wireless communication terminal to execute the steps of: detecting a base station based on a signal received through a wireless communication interface; specifying access management data associated with the detected base station; and controlling access to a file or a program stored in the wireless communication terminal based on the access management data associated with the detected base station.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
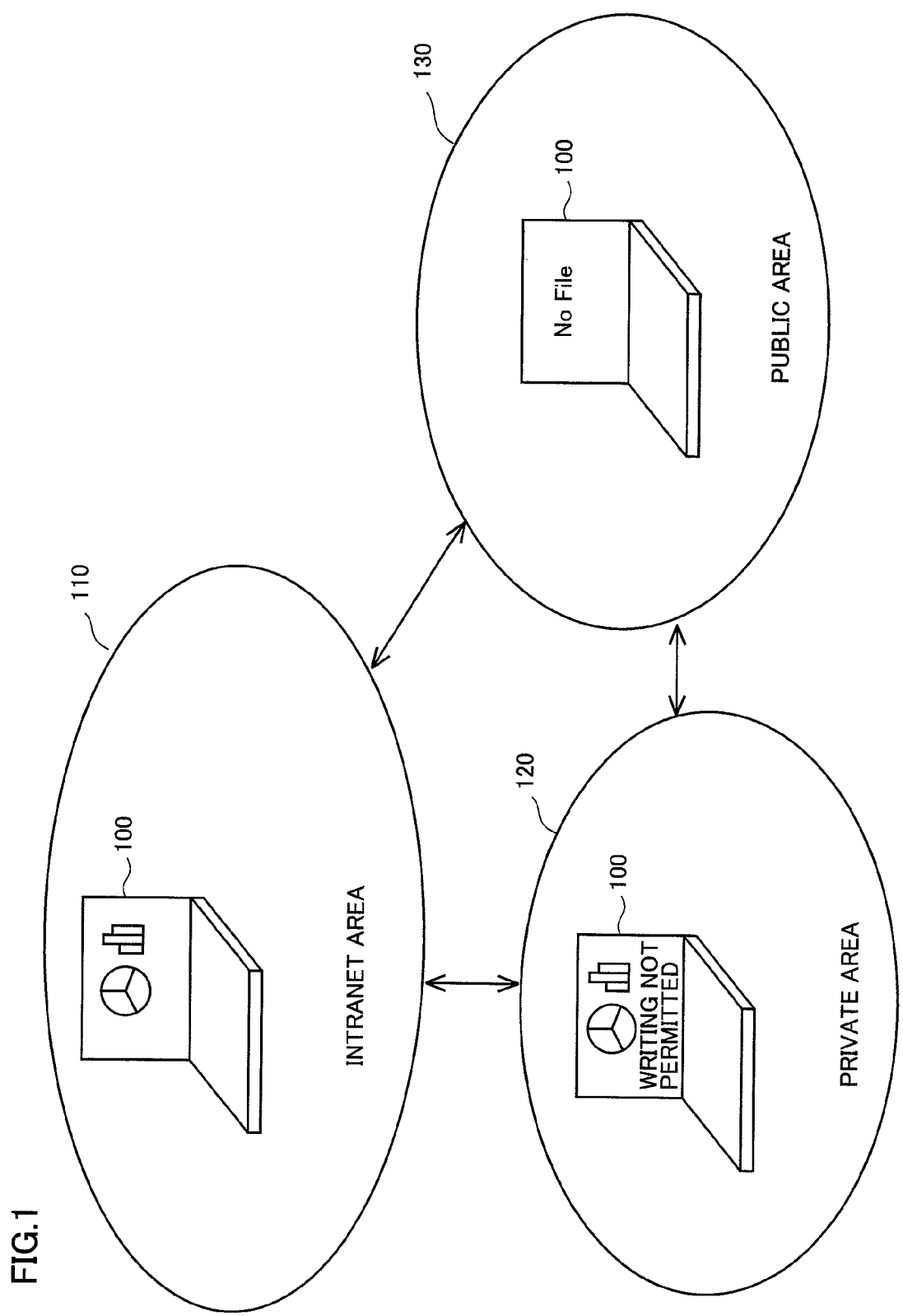
FIG. 1 is a diagram illustrating display contents on a display when a wireless communication terminal 100 according to a first embodiment of the present invention is located in a different communication area.

An embodiment of the present invention will be described hereinafter with reference to the drawings. In the description below, the same elements have the same reference characters allotted and their label and function are also identical. Therefore, detailed description thereof will not be repeated.

<First Embodiment>

With reference to FIG. 1, a manner of display of a file in a wireless communication terminal 100 according to a first embodiment of the present invention will be described. FIG. 1 is a diagram illustrating display contents on a display when wireless communication terminal 100 according to the present embodiment is located in a different communication area.

Wireless communication terminal 100 is implemented, for example, by a portable phone, a notebook or laptop computer system, a PDA (Personal Digital Assistant), a portable navigation terminal, or another portable information processing terminal. A communication area is categorized, for example, into an intranet area 110, a private area 120, and a public area 130.

In the present embodiment, intranet area 110 refers, for example, to a network in a company where a user of wireless communication terminal 100 works and other areas where only a specific user is allowed to communicate. Private area 120 refers to a home of the user of wireless communication terminal 100 and other areas where only that user uses the terminal. Public area 130 refers to an area whether general public user can communicate by radio, such as a station, an airport and other commercial facilities.

In intranet area 110, the user of wireless communication terminal 100 uses that wireless communication terminal 100 to download data such as a file or an application program, for example, from the network in the company. For example, the application program is a program stored in a server device used by a corporation and other organizations and providing information processing service only to a registered user.

In intranet area 110, wireless communication terminal 100 has all rights as access rights to the file or the application program. Here, the access rights include permission of display of a file name, permission of reading of a file, permission of writing data into a file, permission of execution of an application program, and the like. So long as the user uses wireless terminal 100 in intranet area 110, the user can access the file saved in wireless communication terminal 100, change the contents in the file, or execute the application program.

When the user carries the wireless communication terminal out to the home or other private area 120, wireless communication terminal 100 senses change of a base station with which wireless communication is established, and changes the access right to the file or the application program based on sensing. For example, in an example shown in FIG. 1, writing of data into the file is prohibited in wireless communication terminal 100.

In addition, in some cases, the user brings wireless communication terminal 100 on a business trip or the like. Here, wireless communication terminal 100 may be located in public area 130 because it was left behind or stolen. Here, wireless communication terminal 100 senses change of a base station with which wireless communication can be established, and based on a result of sensing, wireless communication terminal 100 shows an indication that nothing is present (for example, characters such as "No File") on a display in order to protect the file or the application program stored in wireless communication terminal 100. As a result of such an indication, an acquirer of wireless communication terminal 100 cannot recognize the file or the application program saved therein. Consequently, as viewing of a file, execution of an application program, or the like is prevented, security of wireless communication terminal 100 is maintained.

Figure 2:
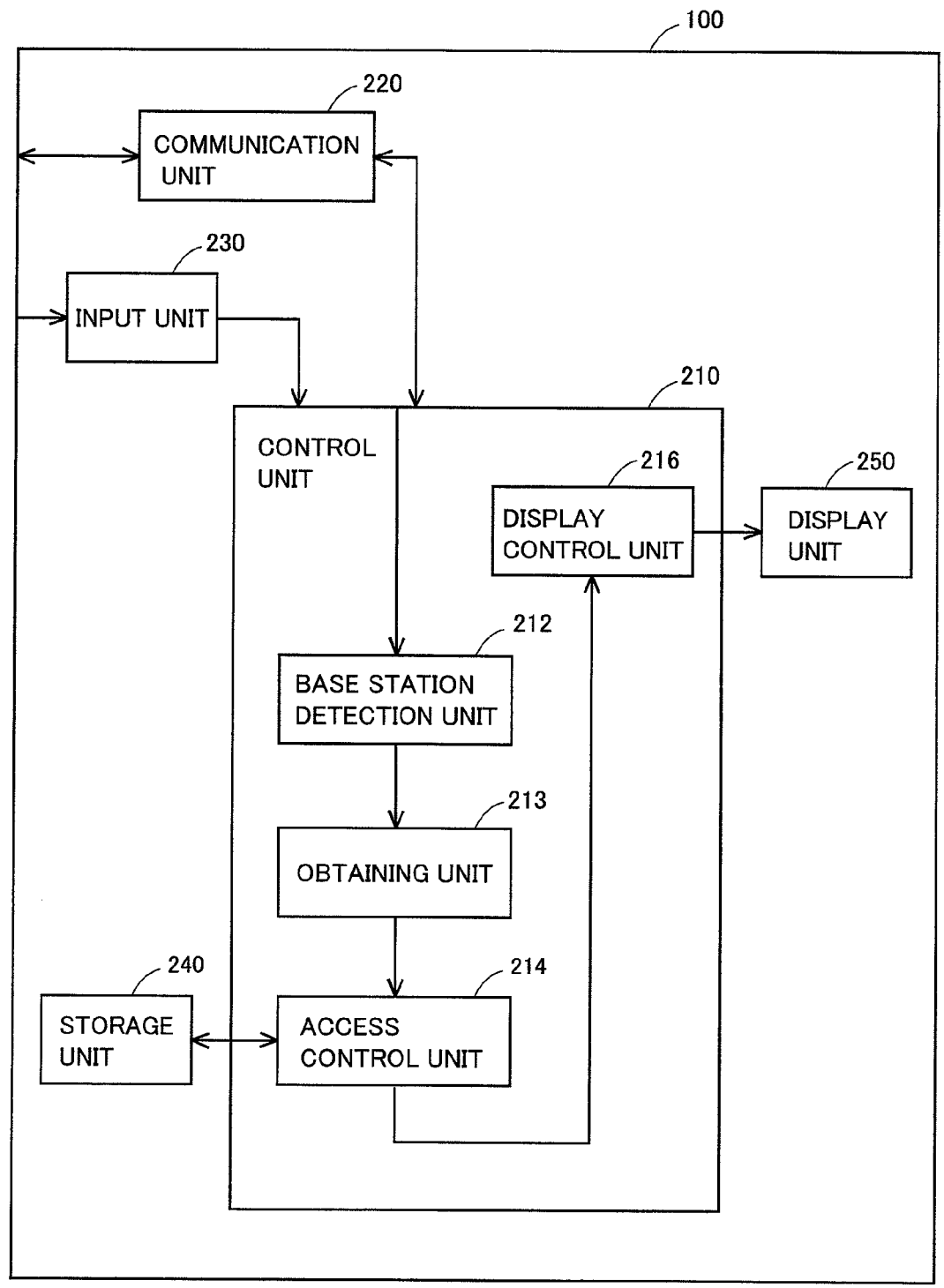
FIG. 2 is a block diagram showing a configuration of a function implemented by wireless communication terminal 100 according to the first embodiment of the present invention.

With reference to FIG. 2, a configuration of wireless communication terminal 100 according to the present embodiment will be described. FIG. 2 is a block diagram showing a configuration of a function implemented by wireless communication terminal 100. Wireless communication terminal 100 includes a control unit 210, a communication unit 220, an input unit 230, a storage unit 240, and a display unit 250. Control unit 210 includes a base station detection unit 212, an access control unit 214, and a display control unit 216.

Control unit 210 controls an operation of wireless communication terminal 100. Communication unit 220 communicates a signal by radio. Input unit 230 accepts an input of an instruction to wireless communication terminal 100 and provides a signal in accordance with the input to control unit 210.

Storage unit 240 stores a file, an application program, other data provided from the outside of wireless communication terminal 100, or data generated in wireless communication terminal 100.

Display unit 250 displays an image under the control of control unit 210. A displayed image includes an image based on a file stored in storage unit 240 or an image generated in accordance with execution of an application program.

Preferably, control unit 210 detects a base station that can communicate with wireless communication terminal 100 based on a signal received by communication unit 220. In addition, control unit 210 controls, as access control unit 214, access to the file or the application program based on access management data associated with identification data of the base station detected by base station detection unit 212. Access control can be implemented, for example on the OS (Operating System) level, or alternatively, access control may be configured such that a specific access control area is provided in a memory area and access is controlled through a specific application program.

Preferably, the access management data includes at least any of data for defining permission of display of a file name, data for defining permission of reading of a file, data for defining permission of writing of data in a file, and data for defining permission of execution of an application program.

Display control unit 216 causes display unit 250 to display an image based on the file or the application program, based on an instruction from access control unit 214. For example, when access control unit 214 provides data prohibiting display of a file name to display control unit 216, display unit 250 displays only an image based on such characters set in advance as "No File" or "No file and application program exists," without displaying a specific file name. In this case, a viewer viewing display unit 250 (for example, a person other than the user of wireless communication terminal 100) does not recognize the fact that a specific file or application program is saved in wireless communication terminal 100. Here, access control unit 214 prohibits data access to a hard disk device and other storage devices.

In addition, when access control unit 214 provides data permitting reading of a file to display control unit 216, display control unit 216 causes display unit 250 to display an image based on the file or the application program based on data stored in storage unit 240. Moreover, when access control unit 214 provides data prohibiting writing into the file to display control unit 216 here, data or other input provided to input unit 230 is not accepted by control unit 210 and data stored in storage unit 240 is protected.

In another aspect, preferably, data protection standard based on each piece of the access management data is different for each piece of the access management data. Control unit 210 detects a plurality of base stations. If protection standard of the access management data associated with each detected base station is different, control unit 210 controls access to the file or the application program based on the access management data higher in the protection standard. Here, the data protection standard is defined in accordance with the number of items permitted in each piece of access management data. Alternatively, for example, definition may be such that data protection standard is lower in the order of display of a file name, reading of a file, and writing in a file (or execution of an application program).

In yet another aspect, the access management data may be associated with data for identifying a node on a communication network, such as MAC (Media Access Control) and other data, in addition to data for identifying the base station.

Figure 3:
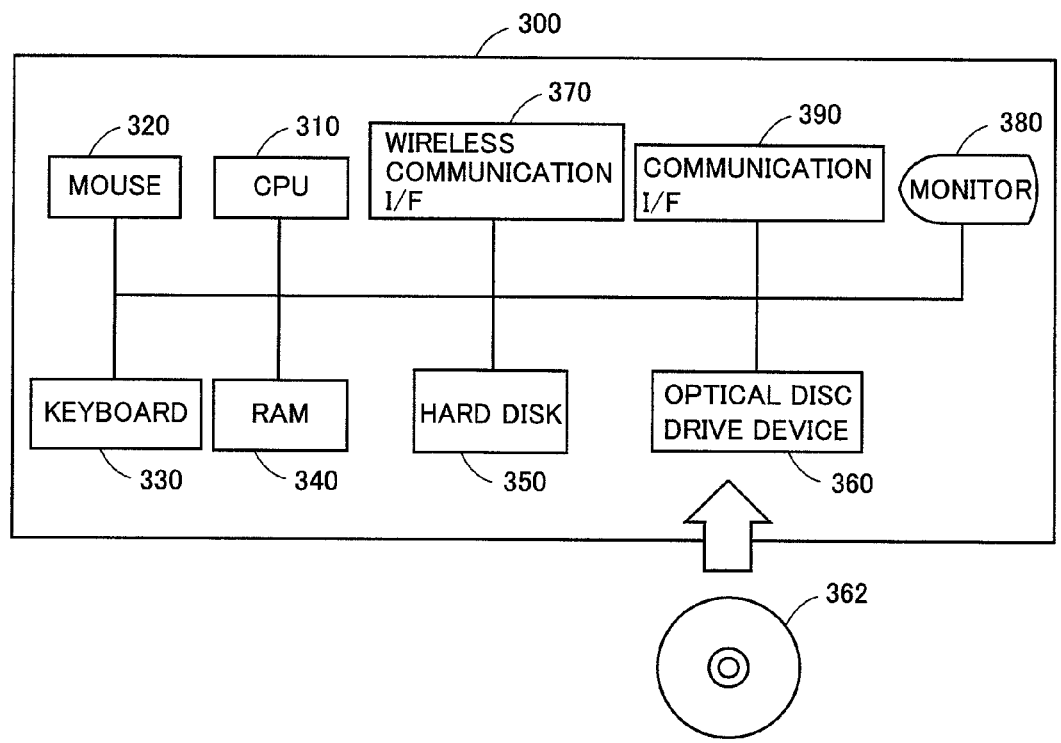
FIG. 3 is a block diagram showing a hardware configuration of a computer system 300 functioning as wireless communication terminal 100.

With reference to FIG. 3, one manner of a specific configuration of wireless communication terminal 100 according to the present embodiment will be described here. FIG. 3 is a block diagram showing a hardware configuration of a computer system 300 functioning as wireless communication terminal 100. Computer system 300 includes, as main components, a CPU (Central Processing Unit) 310, a mouse 320, a keyboard 330, a RAM (Random Access Memory) 340, a hard disk 350, an optical disc drive device 360, a wireless communication I/F (Interface) 370, a monitor 380, and a communication I/F 390. A CD-ROM (Compact Disc-Read Only Memory) and other optical discs can be attached to optical disc drive device 360.

CPU 310 controls an operation of computer system 300 based on an instruction provided to computer system 300. Mouse 320 and keyboard 330 accept an input of an instruction to computer system 300. RAM 340 stores data generated by CPU 310 or data provided from the outside of the computer system in a volatile manner. Hard disk 350 stores data generated by CPU 310 or data provided from the outside of computer system 300 in a non-volatile manner. A flash memory and other recording media may be employed as a non-volatile storage device instead of hard disk 350.

Optical disc drive device 360 accepts attachment of a CD-ROM 362, a DVD-R (Digital Versatile Disc-Recordable), and other recording media, and reads data stored in the recording medium. In addition, if the recording medium is a medium in which data can be written, optical disc drive device 360 can also write data into the recording medium.

Wireless communication I/F 370 communicates by radio with a base station in the vicinity of computer system 300 based on an instruction from CPU 310. A manner of wireless communication is not particularly limited.

Monitor 380 displays an image based on data stored in RAM 340. A dedicated display memory may be used.

Communication I/F 390 accepts connection of an Ethernet (trademark) cable and other communication cables, and establishes communication through the cable.

The processing in computer system 300 is implemented by each piece of hardware and software executed by CPU 310. Such software may be stored in hard disk 350 in advance. Alternatively, software may be stored in CD-ROM 362 or other recording media and distributed as a program product. Alternatively, software may be provided as a program product that can be downloaded by an information provider connected to what is called the Internet. Such software is read from the recording medium by CD-ROM drive device 360 or other reading devices or downloaded through communication I/F 390 or wireless communication I/F 370, and thereafter once stored in hard disk 350 through RAM 340. The software is read from hard disk 350 by CPU 310 and stored in RAM 340 in the form of an executable program. CPU 310 executes that program.

Each component constituting computer system 300 shown in FIG. 3 is general. Therefore, it can be said that the most essential part of the present invention is software stored in RAM 340, hard disk 350, CD-ROM 362, or other recording media, or software that can be downloaded through the Internet and other networks. As the operation of hardware of computer system 300 is well-known, detailed description will not be repeated.

It is noted that a recording medium is not limited to CD-ROM 362, and may be implemented as a medium securely carrying a program, such as an FD (Flexible Disk), a magnetic tape, a cassette tape, an optical disc (MO (Magnetic Optical Disc)/MD (Mini Disc)/DVD (Digital Versatile Disc)), an IC (Integrated Circuit) card (including a memory card), an optical card, and a semiconductor memory such as a ROM, an EPROM (Electronically Programmable ROM), an EEPROM (Electronically Erasable Programmable ROM), and a flash ROM.

In addition, the program herein is not limited to a program that can directly be executed by CPU 310 but may include a program in a source program format, a compressed program, an encrypted program, and the like.

Figure 4:
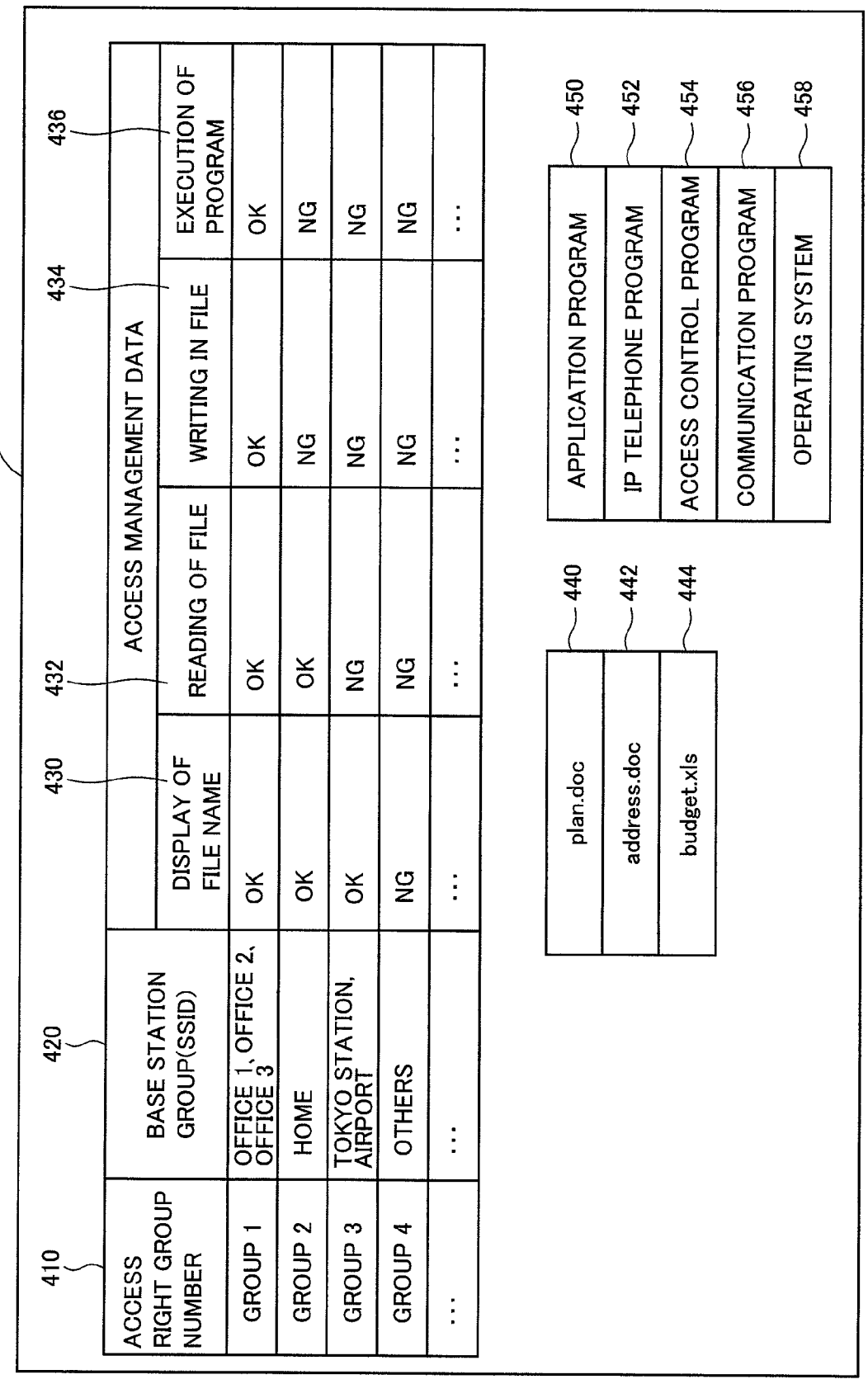
FIG. 4 is a diagram conceptually showing one manner of storage of data in a hard disk 350.

With reference to FIG. 4, a data structure of wireless communication terminal 100 will now be described. FIG. 4 is a diagram conceptually showing one manner of storage of data in hard disk 350. Hard disk 350 includes a plurality of areas for storing data.

Data for identifying an access right group is stored in an area 410. Data for identifying a base station with which wireless communication terminal 100 may establish wireless communication is stored in an area 420. The data is, for example, an SSID (Service Set Identifier), however, other identifiers may be used. The access management data is stored in areas 432, 434 and 436. More specifically, data defining permission of display of a file name is stored in an area 430. Where this data indicates permission of display of a file name, the file name is displayed even if the data is read. On the other hand, where data prohibiting display of a file name is stored in area 430, a specific file name is not displayed even when an instruction indicating display of a file name is given to wireless communication terminal 100.

Data defining permission of reading of a file is stored in memory area 432. If this data prohibits reading of a file, no file is read even when a file read command is given to wireless communication terminal 100.

Data defining permission of writing in a file is stored in memory area 434. Where this data indicates prohibition of writing in a file, a user input provided to input unit 230 is not reflected on a file. Data defining permission of execution of an application program is stored in area 436. Where this data permits execution of an application program, wireless communication terminal 100 executes the application program based on an externally provided instruction indicating execution. On the other hand, where data prohibiting execution of an application program is stored in area 436, wireless communication terminal 100 continues only display of an image based on the program, without executing that program.

Data saved inside by the user of wireless communication terminal 100 is stored, for example, in an area 440, an area 442 and an area 444. More specifically, document data ("plan.doc", "address.doc") is stored in areas 440 and 442. The document data is used for a document edition program possessed by wireless communication terminal 100. A file for spreadsheets is stored in area 444. This file is used by what is called spreadsheet software.

Programs executable by CPU 310 are stored in areas 450, 452, 454, 456, and 458, respectively. The application program is stored in area 450. An application program is, for example, a program for implementing specific processing through communication with a server device (not shown) connected to wireless communication terminal 100. A program for implementing IP telephone is stored in area 452. An access control program is stored in area 454. CPU 310 executes the program in accordance with contents defined by the access management data stored in areas 430, 432, 434, and 436.

A program for allowing wireless communication terminal 100 to communicate by radio with a base station is stored in area 456. An operating system for implementing a basic operation of wireless communication terminal 100 is stored in area 458.

Where data prohibiting execution of a program is stored in connection with the access management data stored in area 436, CPU 310 does not execute an application program (area 450) based on the access management data, even when a command indicating execution of a program is provided to wireless communication terminal 100. Therefore, leakage of information due to use of an application program by a third party can be prevented.

Figure 5:
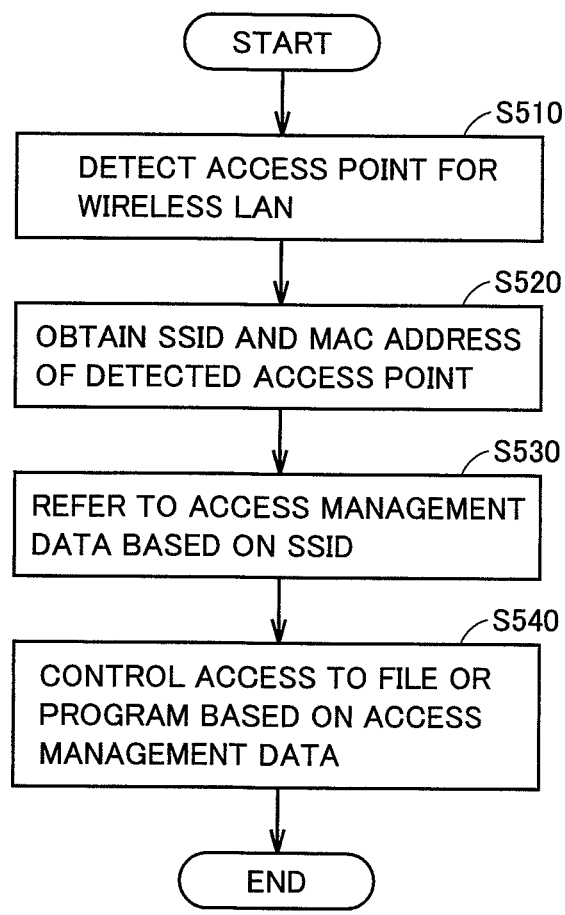
FIG. 5 is a flowchart showing a part of a series of processes performed by a CPU 310 of computer system 300 functioning as wireless communication terminal 100.

A control structure of wireless communication terminal 100 according to the present embodiment will now be described with reference to FIG. 5. FIG. 5 is a flowchart showing a part of a series of processes performed by CPU 310 of computer system 300 functioning as wireless communication terminal 100.

In step S510, CPU 310 detects, as base station detection unit 212, an access point for wireless LAN (Local Area Network) based on a signal sent from wireless communication I/F 370.

In step S520, CPU 310 obtains, as an obtaining unit 213, an SSID (and a MAC address) of the detected access point.

In step S530, CPU 310 serves as access control unit 214 and refers to the access management data stored in hard disk 350 (areas 430, 432, 434, and 436) based on the obtained SSID. CPU 310 specifies specific contents in the access management data from the obtained SSID and writes data indicating the result of specifying in an area temporarily secured in RAM 340.

In step S540, CPU 310 controls access to the file or the program based on the access management data, which is more specifically described as follows. When an access right group 1 is specified (area 410) by the SSID (area 420) of the access point detected by CPU 310, such access management data as display of a file name=OK, reading of a file=OK, writing in a file=OK, and execution of an application program=OK is obtained. Here, wireless communication terminal 100 can accept any of display of a file name, reading and display of a file, writing of data into the displayed file, and execution of an application program. On the other hand, if the SSID based on the detected access point corresponds to an access right group 4, the access management data above indicates NG for each item. Here, a file name is not displayed, a file is not read either, and writing into a file is not permitted either. In addition, the application program is not executed either.

[Operation of Wireless Communication Terminal 100]

An operation of wireless communication terminal 100 according to the present embodiment based on the structure above will be described.

(Case where User Belongs to Group 1)

While the user of wireless communication terminal 100 is working, an SSID corresponding to any of an office 1, an office 2, and an office 3 is detected as a base station group (FIG. 4, access right group 1).

In this access right group 1, setting of the access management data is such that display of a file name, reading of a file, writing data in a file, and execution of an application program are all set to "OK". Therefore, the user is permitted to display a list of file names stored in wireless communication terminal 100, view the contents in a specific file by opening the file, and change the contents in the file.

In addition, when wireless communication terminal 100 has a specific application program (area 450), the user can execute such an application program (area 436). The application program is, for example, a simulation program used in a company or an in-house electronic payment system.

(Case where User Belongs to Group 2)

When the user brings wireless communication terminal 100 home, wireless communication terminal 100 detects the home as the SSID (area 420) based on a signal emitted from a wireless LAN terminal installed in the user's home. This SSID belongs to an access right group 2 (area 410). In access right group 2, display of a file name (area 430) and reading of a file (area 432) are set to "OK". Therefore, wireless communication terminal 100 is permitted to display a list of the saved files, open the file, and display the contents.

On the other hand, writing in a file (area 434) and execution of an application program (area 436) are set to "NG". Therefore, the user is not permitted to write data in an opened file or execute a specific application program.

(Case where User Belongs to Group 3)

When the user on a business trip uses wireless communication terminal 100 in a waiting room at the Tokyo Station where wireless LAN communication is available, wireless communication terminal 100 detects, for example, the SSID of the Tokyo Station as a new SSID (FIG. 4, area 410, access right group=3).

As to an access right group number 3, display of a file name (area 430) is set to OK. On the other hand, setting of the access management data is such that reading of a file (area 432), writing of data in a file (area 434), and execution of a program (area 436) are set to "NG". Therefore, even the user can solely view the list of files at the Tokyo Station. Therefore, even if the user leaves wireless communication terminal 100 behind or wireless communication terminal 100 is stolen, the contents in the file or the application program saved in wireless communication terminal 100 can be prevented from leaking to a third party.

(Case where User Belongs to Group 4)

If a third party other than the user (or an owner) carries away wireless communication terminal 100, wireless communication terminal 100 may detect an SSID allowing wireless LAN communication. Here, wireless communication terminal 100 detects an SSID other than the base station group (SSID) specified in advance (area 420, access right group 4). Here, setting of the access management data is such that display of a file name, reading of a file, writing in a file, and execution of an application program are all set to "NG". Therefore, as wireless communication terminal 100 does not allow display of a list of file names, the third party cannot know the file and security of wireless communication terminal 100 is maintained.

In one aspect, if a period of time during which wireless communication terminal 100 stays in an area where an SSID included in access right group 4 is detected exceeds a certain period of time set in advance, wireless communication terminal 100 may be configured to erase a contained file, an application program or other data. Security of data in wireless communication terminal 100 can thus further be enhanced.

[Effect of Embodiment]

As described above, wireless communication terminal 100 according to the first embodiment of the present invention can provide a file or an application program with security depending on a location where wireless communication is available. In summary, wireless communication terminal 100 detects an access point for wireless LAN and specifies an SSID corresponding to the access point. As wireless communication terminal 100 has access management data in advance for an SSID that may be specified, wireless communication terminal 100 refers to the access management data of the SSID corresponding to the detected access point. Wireless communication terminal 100 restricts permission of display of a file name, reading of a file, writing in a file, and execution of an application program, based on the access management data.

By doing so, access to the file or the application program can be controlled depending on a location where wireless communication terminal 100 is present.

In addition, even though a third party other than an original user (owner) may use wireless communication terminal 100 as a result of theft or leaving behind, security depending on a place of use is maintained and hence data in wireless communication terminal 100 is protected.

In another aspect, access control may be configured such that a log-in user name or group name in Linux is changed. In addition, access control is not limited to an example using an SSID in an extensive wireless LAN environment (such as the whole floor area of a company, an airport, or an exhibition site), but access control may be configured such that an access ID for accessing a wireless communication system in a narrow area (such as wireless LAN at home) is employed.

In addition, not only the SSID but also information on success/failure in registration (registration of an address of wireless communication terminal 100) in an SIP (Session Initiation Protocol) server for IP telephone may be used as information for access control. The security level can thus further be enhanced. For example, the configuration may be such that, when wireless communication terminal 100 detects failure in registration due to unauthorized use while wireless communication terminal 100 is located in an area where reading of a file is permitted, setting of the access management data is changed to prohibit reading of a file.

<Second Embodiment>

A second embodiment of the present invention will be described hereinafter. A wireless communication terminal according to the present embodiment is different from that in the first embodiment described previously in a function to sense change of a base station with which wireless communication can be established and to change access control depending on a result of sensing. A wireless communication terminal 600 according to the present embodiment is implemented by using a hardware configuration similar to that of wireless communication terminal 100 according to the first embodiment. Therefore, detailed description of the hardware configuration will not be repeated.

Figure 6:
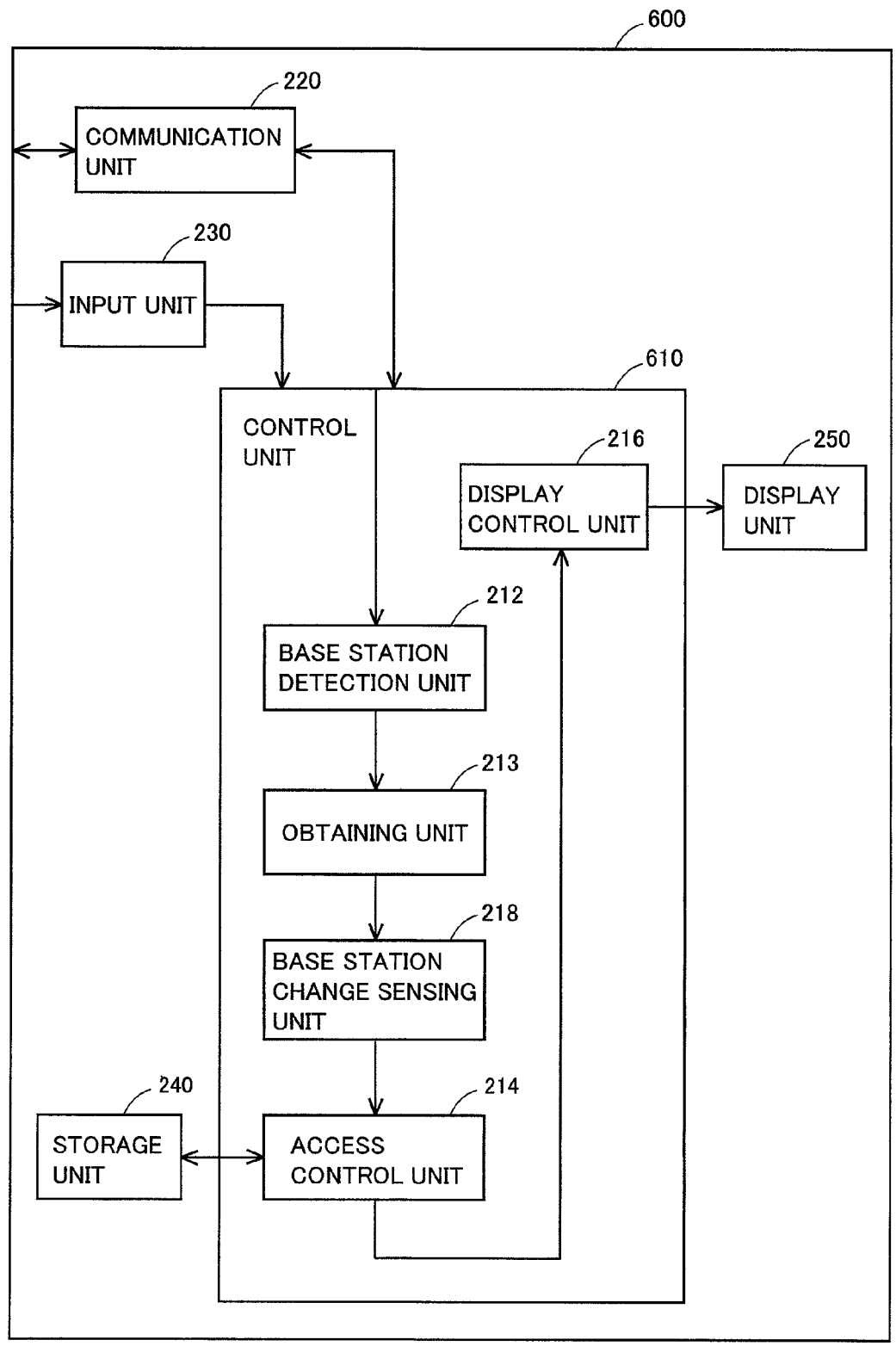
FIG. 6 is a block diagram showing a configuration of a function implemented by a wireless communication terminal 600 according to a second embodiment of the present invention.

With reference to FIG. 6, a configuration of wireless communication terminal 600 according to the present embodiment will be described. FIG. 6 is a block diagram showing a configuration of a function implemented by wireless communication terminal 600. Wireless communication terminal 600 further includes a base station change sensing unit 218 in addition to the configuration shown in FIG. 2. Wireless communication terminal 600 includes a control unit 610 instead of control unit 210.

Base station change sensing unit 218 senses change of the base station detected as the base station with which wireless communication can be established. For example, base station change sensing unit 218 sequentially refers to history of the SSID obtained by obtaining unit 213 and periodically monitors change of that SSID. Interval of monitoring may be set to a predetermined certain period of time or it may be set in response to an input to input unit 230, communication unit 220 or the like.

If the access management data associated with the newly sensed base station is different from the access management data associated with the base station that had been detected prior to sensing of the change, control unit 610 controls access to the file or the application program based on the access management data associated with the newly sensed base station. For example, when change from the base station, for which reading of a file has been permitted, to the base station, for which display of a file name is prohibited, is sensed, control unit 610 closes the file that has been displayed and the file name is no longer displayed.

Figure 7:
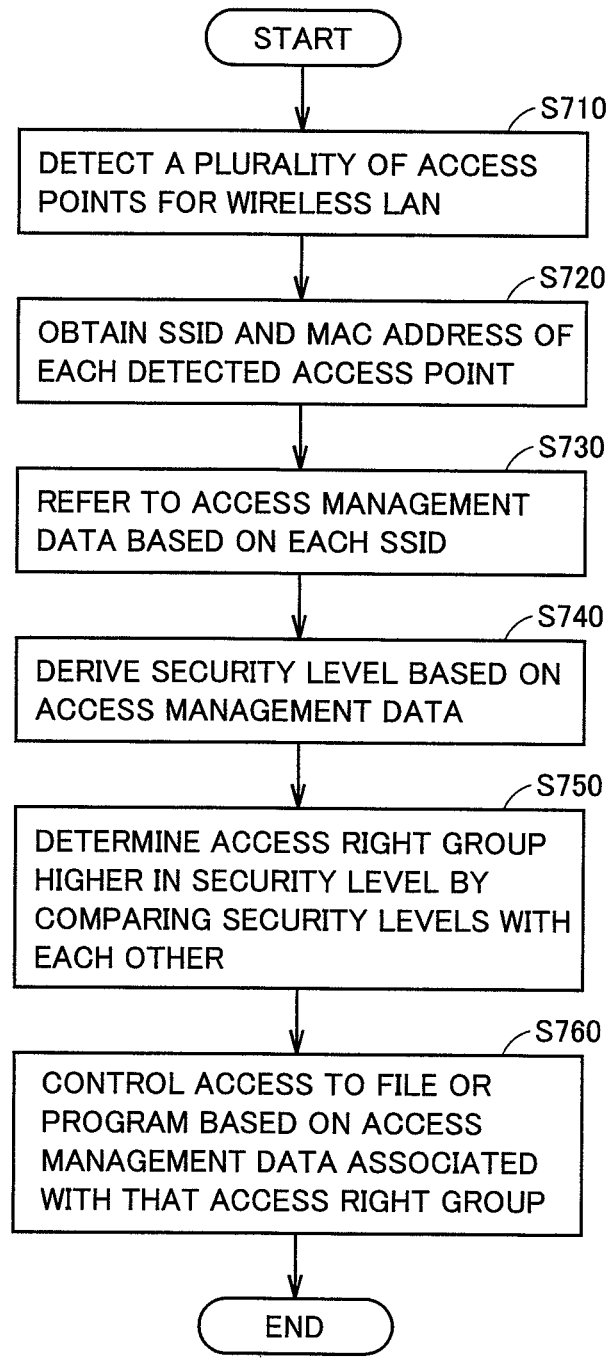
FIG. 7 is a flowchart showing a part of a series of processes performed by a control unit 610 in wireless communication terminal 600.

With reference to FIG. 7, a control structure of wireless communication terminal 600 according to the present embodiment will be described. FIG. 7 is a flowchart showing a part of a series of processes performed by control unit 610. In one aspect, these processes are implemented by CPU 310 of computer system 300 functioning as wireless communication terminal 600.

In step S710, control unit 610 detects a plurality of access points for wireless LAN based on a signal sent from communication unit 220. Although the timing of detection follows, for example, the order of reception of signals, in another aspect, the configuration may be such that an access point registered in advance (that is, an access point for which access management data has been set) is detected and then an unregistered access point is recognized. Here, access management data may be set for a newly recognized access point.

In step S720, control unit 610 obtains an SSID and a MAC address of each detected access point from the signal sent from communication unit 220.

In step S730, control unit 610 refers to the access management data based on each SSID (FIG. 4).

In step S740, control unit 610 derives security level based on each piece of access management data. For example, control unit 610 counts the number of items of which data contents indicate NG, among four items (see FIG. 4) constituting the access management data. Here, the maximum number of NGs, i.e., four, indicates prohibition of all types of accesses and the security level is highest. On the other hand, if all the contents in the access management data indicate OK, OK is calculated as 0 and the security level is 0. Here, wireless communication terminal 600 can control access to data such as a file, an application program or the like saved inside, based on security level highest in value.

In step S750, control unit 610 determines an access right group higher in security level by comparing security levels calculated for respective SSIDs with each other.

In step S760, control unit 610 controls access to the file or the application program based on the access management data associated with the access right group.

As described above, according to wireless communication terminal 600 in the second embodiment of the present invention, a plurality of access points for wireless communication are detected and the SSID of each access point is specified. Wireless communication terminal 600 derives a value for security level for each SSID. Wireless communication terminal 600 controls access to the stored file or application program, in accordance with the access management data associated with the SSID highest in value among calculated values. Thus, even if wireless communication terminal 600 detects a plurality of SSIDs, the security level can be prevented from lowering.

Alternatively, instead of determining the security level as high or low by counting the number of OKs or NGs in the access management data, in another aspect, access to a file or an application program may be controlled based on setting of an SSID associated with an item highest in priority that has been set for items themselves in the access management data.

Alternatively, in another aspect, a random key input pattern registered in advance for resetting security may be saved in wireless communication terminal 600, in order for an authorized user of wireless communication terminal 600 to access a file or an application program. Thus, even in an area where access is restricted, the authorized user can temporarily lift access restriction by inputting the key input pattern to wireless communication terminal 600.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A wireless communication terminal, comprising:
a communication unit configured to communicate a signal by radio;
a storage unit configured to store a file or a program, a plurality of pieces of identification data for identifying each of a plurality of base stations with which the wireless communication terminal can communicate, and access management data associated with each piece of the identification data for controlling access to the file or the program for each of the base stations;
a display unit configured to display an image; and
a control unit configured to control an operation of the wireless communication terminal, wherein the control unit is configured to
   detect the plurality of base stations that can communicate with the wireless communication terminal based on the signal received by the communication unit and
   control access to the file or the program based on the access management data associated with the identification data of each of the detected base stations,
   wherein access to the file or the program includes display of the filename of the file, read/write from/to the file, and execution of the program,
wherein a security level based on the access management data for each of the plurality of base stations is different for at least two of the plurality of base stations,
wherein the control unit is further configured to control access to the file or the program based on the access management data having the highest security level when the protection standard of the access management data associated with the detected base stations is different, and
wherein the security level is derived from the access management data, for each of the plurality of base stations, by counting the number of items whose access is not permitted by the access management data.

2. The wireless communication terminal according to claim 1, wherein the control unit is configured to sense changes of a base station detected as a base station with which communication can be established and to control access to the file or the program based on the access management data associated with newly sensed the base station when the access management data associated with the newly sensed base station is different from the access management data associated with the base station that had been detected prior to sensing of the change.

3. The wireless communication terminal according to claim 1, wherein the access management data is associated with data for identifying a node on a communication network in addition to the identification data.

4. The wireless communication terminal according to claim 1, the data protection standard is set corresponding to each of the base stations.

5. A method for protecting data stored in a wireless communication terminal, comprising:
   detecting a plurality of base stations based on a signal received through a wireless communication interface;
   specifying access management data associated with each of the detected base stations; and
   controlling access to a file or a program stored in the wireless communication terminal based on the access management data associated with each of the detected base stations,
   wherein a security level based on the access management data for each of the plurality of base stations is different for at least two of the plurality of base stations,
   wherein the controlling includes:
      controlling access to the file or the program based on the access management data having the highest security level when the protection standard of the access management data associated with the detected base stations is different,
      wherein access to the file or the program includes display of the filename of the file, read/write from/to the file, and execution of the program, and
   wherein the security level is derived from the access management data, for each of the plurality of base stations, by counting the number of items whose access is not permitted by the access management data.

6. The method according to claim 5, wherein the controlling includes:
   sensing change of the base station detected as the base station with which communication can be established; and
   controlling access to the file or the program based on the access management data associated with newly sensed the base station when the access management data associated with the newly sensed base station is different from the access management data associated with the base station that had been detected prior to sensing of the change.

7. The method according to claim 5, wherein the access management data is associated with data for identifying a node on a communication network in addition to identification data of the base station.

8. The method for protecting data stored in a wireless communication terminal according to claim 5, the data protection standard is set corresponding to each of the base stations.

9. A non-transitory computer-readable recording medium storing a program for protecting data stored in a wireless communication terminal, the program causing the wireless communication terminal to execute the steps of:
   detecting a plurality of base stations based on a signal received through a wireless communication interface;
   specifying access management data associated with each of the detected base stations; and
   controlling access to a file or a program stored in the wireless communication terminal based on the access management data associated with each of the detected base stations, wherein access to the file or the program includes display of the filename of the file, read/write from/to the file, and execution of the program,
   wherein a security level based on the access management data for each of the plurality of base stations is different for at least two of the plurality of base stations,
   wherein access to the file or the program is controlled based on the access management data having the highest security level when the protection standard of the access management data associated with the detected base stations is different, and
   wherein the security level is derived from the access management data, for each of the plurality of base stations, by counting the number of items whose access is not permitted by the access management data.

10. The non-transitory computer-readable recording medium storing a program according to claim 9, the data protection standard is set corresponding to each of the base stations.

* * * * *